(12) United States Patent
Schmitt

(10) Patent No.: US 8,212,489 B2
(45) Date of Patent: Jul. 3, 2012

(54) CIRCUIT ARRANGEMENT AND METHOD FOR STARTING AND OPERATING ONE OR MORE DISCHARGE LAMPS

(75) Inventor: Harald Schmitt, München (DE)

(73) Assignee: Osram AG, München (DE)

(*) Notice: Subject to any disclaimer, the term of this patent is extended or adjusted under 35 U.S.C. 154(b) by 424 days.

(21) Appl. No.: 12/523,659

(22) PCT Filed: Jan. 17, 2007

(86) PCT No.: PCT/EP2007/050447
§ 371 (c)(1),
(2), (4) Date: Jul. 17, 2007

(87) PCT Pub. No.: WO2008/086892
PCT Pub. Date: Jul. 24, 2008

(65) Prior Publication Data
US 2010/0013401 A1 Jan. 21, 2010

(51) Int. Cl.
*G05F 1/00* (2006.01)
(52) U.S. Cl. .......... 315/219; 315/94; 315/307; 315/246
(58) Field of Classification Search .......... 315/94, 315/246, 209 R, 115, 224, 307, 185 R, 210, 315/219
See application file for complete search history.

(56) References Cited

U.S. PATENT DOCUMENTS

| | | | | |
|---|---|---|---|---|
| 5,424,611 A | * | 6/1995 | Moriarty, Jr. | 315/94 |
| 5,925,984 A | * | 7/1999 | Fischer et al. | 315/219 |
| 6,057,611 A | * | 5/2000 | Reiser | 307/125 |
| 6,316,886 B1 | * | 11/2001 | Luger et al. | 315/307 |
| 6,744,219 B2 | * | 6/2004 | Neidlinger | 315/224 |
| 6,744,220 B2 | * | 6/2004 | Neidlinger | 315/244 |
| 7,394,206 B2 | * | 7/2008 | Yu et al. | 315/209 R |
| 7,863,830 B2 | * | 1/2011 | Schemmel et al. | 315/291 |
| 7,911,148 B2 | * | 3/2011 | Fischer et al. | 315/219 |
| 8,008,873 B2 | * | 8/2011 | Bakre et al. | 315/308 |
| 2005/0116662 A1 | | 6/2005 | Sanchez | |

FOREIGN PATENT DOCUMENTS

| | | |
|---|---|---|
| DE | 44 25 859 | 1/1996 |
| EP | 0 417 315 | 3/1991 |
| EP | 1 359 791 | 11/2003 |

* cited by examiner

*Primary Examiner* — Vibol Tan
(74) *Attorney, Agent, or Firm* — Cozen O'Connor

(57) ABSTRACT

A circuit arrangement for starting and operating one or more discharge lamps comprising a self-oscillating inverter (1), a resonant circuit (2), a low-pressure discharge lamp (5), a starting voltage controller (3) with a variable resistor (R1), and a lamp filament heating controller (4), wherein the lamp filament heating controller includes an additional variable resistor (R2) in the resonant circuit, which variable resistor measures the current flowing in the resonant circuit, and, in the event of a threshold value being exceeded, disconnects the half-bridge transistor (Q2) and thus limits the current flowing in the resonant circuit, this additional variable resistor (R2) being bypassed by a switch (Q3), depending on the lamp state.

8 Claims, 2 Drawing Sheets

US 8,212,489 B2

CIRCUIT ARRANGEMENT AND METHOD FOR STARTING AND OPERATING ONE OR MORE DISCHARGE LAMPS

RELATED APPLICATIONS

This is a U.S. national stage of application No. PCT/EP2007/050447, filed on Jan. 17, 2007.

FIELD OF THE INVENTION

The present invention relates to a circuit arrangement for discharge lamps, primarily those discharge lamps which have preheatable electrodes. The invention also relates to a method for starting and operating a discharge lamp.

BACKGROUND OF THE INVENTION

Electronic ballasts for discharge lamps have proven to be very successful in recent times owing to their known advantages such as increased luminous efficiency and improved efficiency. Conventional low-pressure discharge lamps have heating filaments in the form of electrodes which are heated prior to lamp starting (so-called preheating) in order to increase their emission capacity and therefore to increase the willingness of the lamp to start. In order to ensure effective heating of the filaments, various circuit variants have proven successful in the prior art.

Before the lamp can be operated, it needs to be started by a relatively high voltage. For this purpose, resonance excitation of the lamp resonant circuit is used in many cases. In the case of discharge lamps with preheatable electrodes, the electrodes are first preheated for a specific time before the actual starting voltage is applied. The preheating time is in this case determined by a lamp filament heating controller, which in many cases damps the resonant circuit and/or sets the resonant circuit to off-resonance and therefore keeps the voltage low, with at the same time a current flowing through the lamp filaments.

A simple and extended variant of ensuring preheating is a circuit in which a PTC thermistor is connected in parallel with the lamp and with the resonant capacitor. If the electronic ballast is switched on and the inverter starts up, the PTC thermistor will initially be conducting and allows a preheating current to flow through the electrodes. Owing to the preheating current, the PTC thermistor itself also heats up and ultimately assumes a high resistance value. Therefore, the resonant circuit, which is responsible for the lamp starting, is now only weakly damped and a starting voltage, which is sufficient for starting the lamp, can be built up.

An improved variant of this circuit is specified in DE 41 29 430 A1. Here, the resonant capacitor is split in two, and the PTC thermistor is connected in parallel with one part of the resonant capacitor. This has the advantage that the frequency is closer to the resonant frequency during preheating and therefore a higher preheating current flows, which reduces the preheating time.

Both circuits have the disadvantage that a current flows through the PTC thermistor throughout the entire operating time in order to heat said PTC thermistor such that it keeps a high resistance value. Therefore, it causes a power loss of approximately 0.5-1 watt, which reduces the efficiency of the entire electronic ballast. A further disadvantage is the long cooling-down time of the PTC thermistor, which entails insufficient preheating of the lamp electrodes when the lamp is briefly switched off.

DE 44 25 859 A1 has disclosed an improved circuit which does not have these disadvantages. This circuit simulates a PTC thermistor without having the disadvantage thereof with respect to the high power loss. In principle, in this case, the PTC thermistor is simulated by a transistor (Q3) with a series resistor (Z). During the preheating, the transistor is switched on and represents a resistive load, which drives a preheating current through the lamp electrodes. At the end of the preheating period, the transistor is disconnected in order thus to initiate starting. In the disconnected state, no relevant losses occur. This circuit does not have the disadvantage of insufficient preheating in the event of a brief interruption to the lamp operation either. However, this circuit, as can be seen from the figures of the document, is relatively complex in terms of construction and is therefore cost-intensive.

SUMMARY OF THE INVENTION

One object of the present invention is to provide a circuit which provides effective preheating of the lamp electrodes, but can be produced in a more cost-effective manner.

In accordance with one aspect of the invention, a circuit arrangement with a self-oscillating inverter is used as a basis, as is often used in cost-effective ballasts. The half bridge has, in addition to starting voltage limitation, additional current limitation of the resonant circuit, which is used for cost-effective preheating. The current limitation is provided by virtue of an additional variable resistor in the current path of the half bridge, which variable resistor can be bypassed by a transistor. The transistor is driven by means of a simple circuit in such a way that a type of sequential control is provided for preheating and starting. Thus, effective preheating of the lamp electrodes is realized in a cost-effective manner.

BRIEF DESCRIPTION OF THE DRAWING(S)

PREFERRED EMBODIMENT OF THE INVENTION

Figure 1:
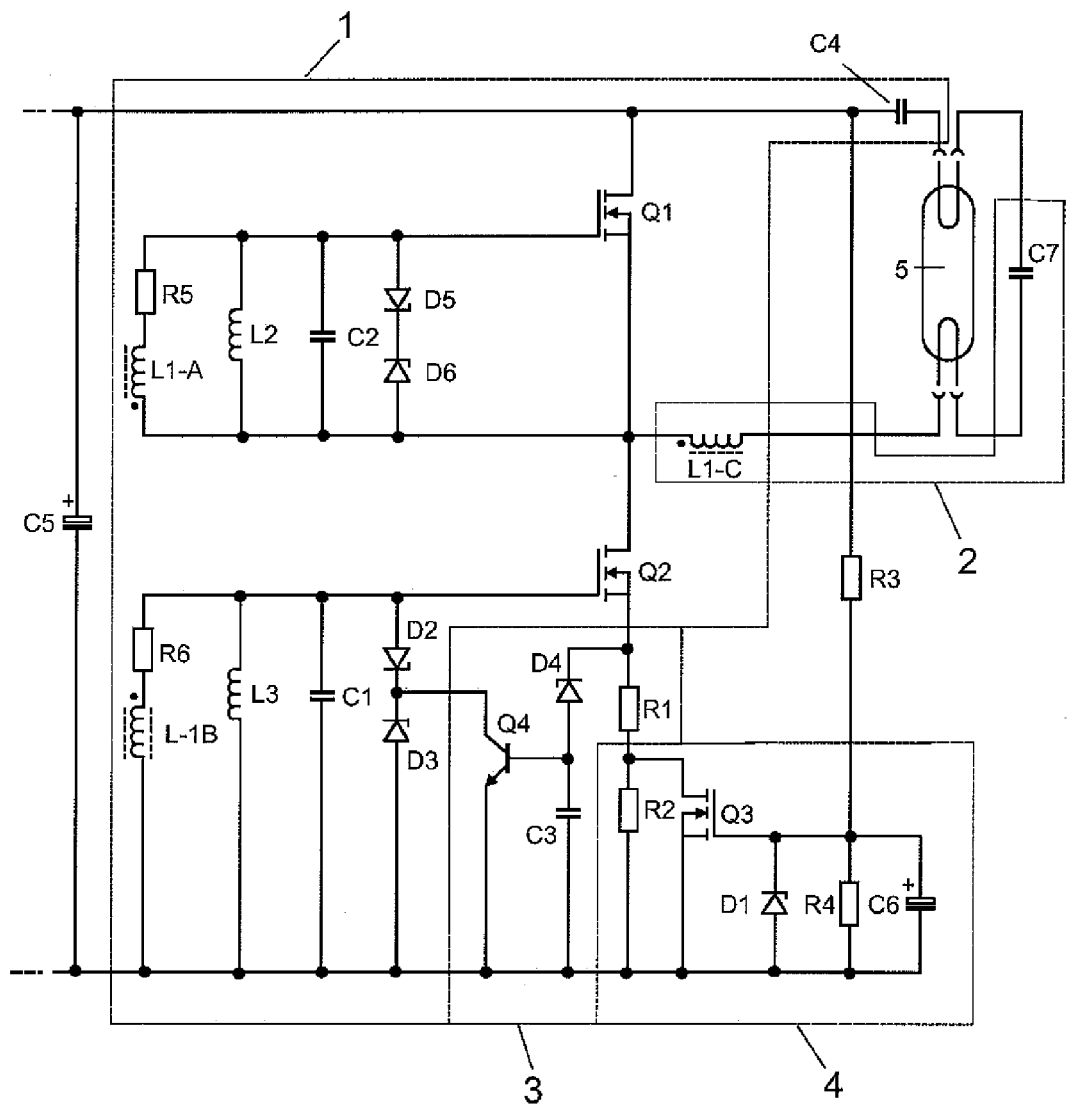
FIG. 1 shows a circuit arrangement according to an embodiment of the invention.

FIG. 1 shows a circuit arrangement according to the invention with an inverter (1), a resonant circuit (2), a discharge lamp (5), a starting voltage controller (3) and the lamp filament heating controller (4). In this figure, the inverter is a phase controller, but any other desired self-oscillating inverter topologies are also possible. As is conventional in the case of self-oscillators, there is an inductive component (L1) with three windings, of which one acts as the lamp inductor (L1-C) and the other two (L1-A, L1-B) each drive a half-bridge transistor. The lamp inductor is also part of a resonant circuit (2), together with a resonant capacitor (C7). The starting voltage is controller measures the resonant current in the form of a voltage across the resistor R1. This voltage is present across the diode D4. As soon as this voltage is higher than the zener voltage of the diode, the diode is turned on, and charges the capacitor C6. Said capacitor has a very low capacitance, with the result that the capacitor voltage soon rises above the switching voltage of the transistor Q4. This transistor turns on and disconnects the lower transistor. As a result of this switching, the half-bridge transistor is therefore disconnected prematurely, in time with the resonant frequency, in order thus also to limit the resonant voltage. In the present exemplary embodiment, this only takes place in the case of the lower transistor, for which reason the load circuit current flow is unbalanced, as can be seen from the envelope current curve in FIG. 2. However, it is also conceivable for this circuit to be provided in both half-bridge branches in order to keep the load circuit current balanced.

The lamp filament heating controller finally likewise measures the resonant current in the form of a voltage across the resistors R1 and R2 which are connected in series, and disconnects the lower transistor, in time with the resonant frequency, above a specific current level which is lower than the starting voltage control in order thus to limit the voltage across the lamp to a greater extent. As a result, the lamp electrodes are preheated until the resistor R2 is "active". Since the voltage across the zener diode D4 is now markedly higher owing to the resistors connected in series, the transistor Q4 turns on markedly earlier than in the case of only starting voltage control and therefore disconnects the half-bridge transistor earlier. This results in an increase in the frequency, with the result that in this case the frequency is now also markedly above the resonant frequency, which assists in even more effectively avoiding premature lamp starting with electrodes which are too cold.

The sequential control of preheating and starting is realized by the remaining components of the lamp filament heating controller (4). The capacitor C6 is charged by the resistor R3. If the voltage of said capacitor exceeds the switching threshold of Q3, the latter switches on and bypasses the resistor R2. The control of the current limitation is therefore inhibited in the filament preheating mode, and the inverter can be brought to resonance. This works because the voltage across the diode D4 is now only present across R1 owing to the fact that the resistor R2 is bypassed, and therefore D4 only responds at relatively high currents, whereupon the bypassing transistor Q2 can remain switched on for longer again. After the filament preheating, the lamp is therefore started, and the inverter can assume its normal operating mode after starting. The preheating time after brief interruptions to the power supply can be shortened by virtue of the selection of the resistor R4.

Figure 2:
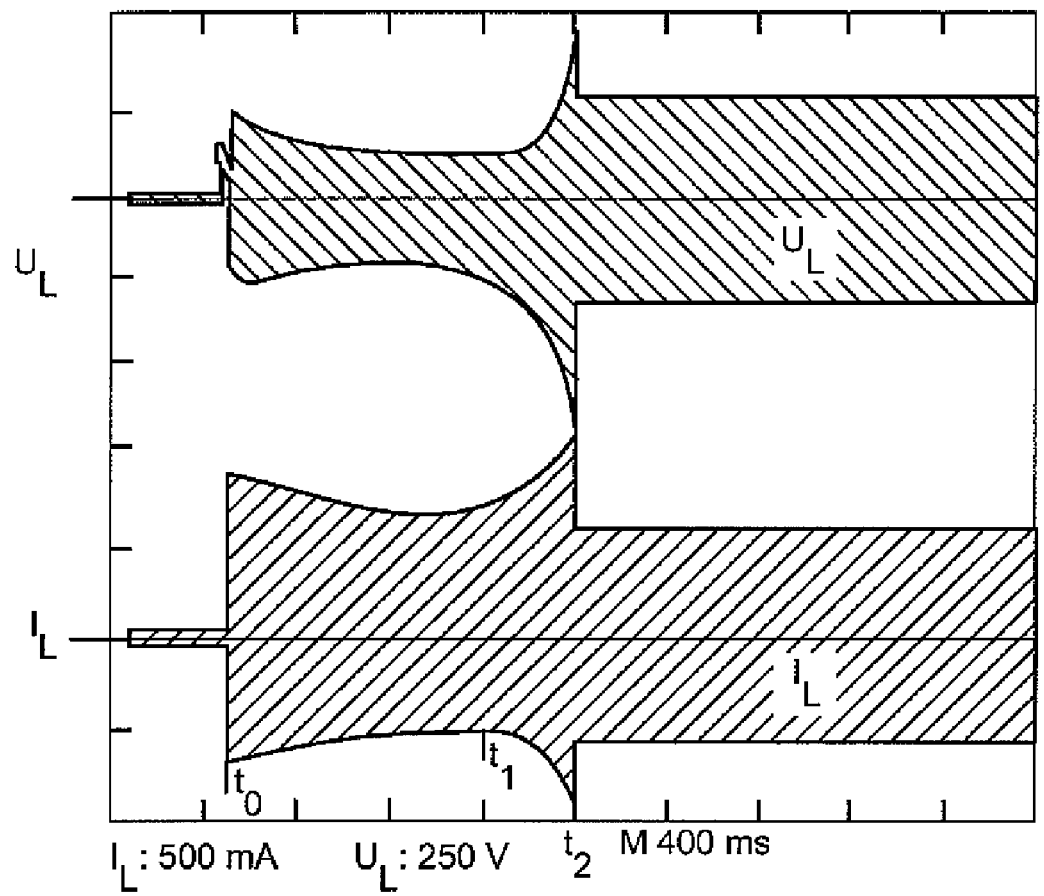
FIG. 2 shows the preheating/lamp current and the lamp voltage over time.

This sequence of preheating, starting and operating is shown in FIG. 2. The lower envelope represents the load circuit current $I_L$ (preheating current $t_0$-$t_2$, lamp current>$t_2$), and the upper envelope represents the voltage across the lamp $U_L$. At time $t_0$, the inverter is switched on, the transistor Q3 is open and the inverter is therefore in the preheating operating mode. Owing to the unbalanced "braking" of the half bridge, the preheating current is also unbalanced, which is apparent from the envelope which is offset "upwards" with respect to the zero line. At time $t_1$, the transistor Q3 switches on, the half bridge enters resonance, the load circuit current $I_L$ and also the lamp voltage, which is represented in the curve $U_L$, as a consequence increase severely until the lamp is restarted at time $t_2$. From this point on, the starting voltage control is also no longer active since the operating currents are markedly lower than the response limit of the diode D4. As a result, the lamp current is balanced.

An embodiment of a 49 W fluorescent lamp is illustrated by way of example in the table below. In this case, the diode D4 is a normal silicon diode which is introduced in the direction of flow, with the result that the forward voltage of the diode is used as the "zener voltage".

| Position | Value |
| --- | --- |
| C1 | 3.9 nF |
| C2 | 3.9 nF |
| C3 | 10 nF |
| C4 | 220 nF |
| C5 | 22 µF |
| C6 | 10 µF |
| C7 | 6.8 nF |
| D1 | zener diode 11 V |
| D2 | zener diode 18 V |
| D3 | zener diode 18 V |
| D4 | 1N4148 (other pol.) |
| D5 | zener diode 18 V |
| D6 | zener diode 18 V |
| L1 | 1.9 mH, 180:15:15 |
| L2 | 4.7 mH |
| L3 | 4.7 mH |
| Q1 | STB 3NC60 |
| Q2 | STB 3NC60 |
| Q3 | NDS351AN |
| Q4 | BC847C |
| R1 | 0.56 ohm |
| R2 | 3.3 ohms |
| R3 | 3.6 Mohms |
| R4 | 240 kohms |
| R5 | 3.3 kohms |
| R6 | 3.3 kohms |

It goes without saying that the circuit can also be matched to other lamp types without deviating from the concept in accordance with the invention.

The invention claimed is:

1. A circuit arrangement for starting and operating one or more discharge lamps comprising:
    a self-oscillating inverter,
    a resonant circuit,
    a low-pressure discharge lamp,
    a starting voltage controller with a variable resistor, and
    a lamp filament heating controller,
    wherein the lamp filament heating controller includes an additional variable resistor which measures current flowing in the resonant circuit, and, in an event of a threshold value being exceeded, disconnects a half-bridge transistor and thus limits the current flowing in the resonant circuit, this additional variable resistor being bypassed by a switch, depending on a state of the low-pressure discharge lamp.

2. The circuit arrangement for starting and operating one or more discharge lamps as claimed in claim 1, wherein the switch is a field effect transistor.

3. The circuit arrangement for starting and operating one or more discharge lamps as claimed in claim 1, wherein the switch is open during starting of an inverter.

4. The circuit arrangement for starting and operating one or more discharge lamps as claimed in claim 1, wherein the switch is switched on by charging of a capacitor via a voltage divider after a predetermined time in order thus to bypass the variable resistor.

5. The circuit arrangement for starting and operating one or more discharge lamps as claimed in claim 1, wherein a preheating time of the lamp electrodes is settable by selecting resistance values of the voltage divider.

6. The circuit arrangement for starting and operating one or more discharge lamps as claimed in claim 5, wherein it is possible to shorten the preheating time after brief interruptions to the power supply by selection of a resistance value of a resistor of the voltage divider.

7. The circuit arrangement for starting and operating one or more discharge lamps as claimed in claim 1, wherein the preheating time depends on the directly preceding switch-off duration, and the preheating time is selected on the basis of the switch-off duration in such a way that the correct preheating energy is always applied to the lamp electrodes.

8. A method for starting and operating one or more discharge lamps with a self-oscillating inverter, a resonant circuit, a low-pressure discharge lamp, a starting voltage controller and a lamp filament heating controller with a variable resistor for current limitation and a bypassing switch, wherein the method comprises the steps of:

switching on the self-oscillating inverter with a current-limited resonant circuit;

heating electrodes of the low-pressure discharge lamp with the current-limited resonant circuit;

disconnecting the current limitation by bypassing the variable resistor with the bypassing switch;

starting the lamp by setting an inverter resonant frequency; and operating the low-pressure discharge lamp in a steady state.

* * * * *